US008518508B2

(12) United States Patent
Kato et al.

(10) Patent No.: US 8,518,508 B2
(45) Date of Patent: Aug. 27, 2013

(54) HIGHLY-DURABLE TUBE USABLE FOR MOVEMENT UNIT FOR ROTATION, FLEXION, AND THE LIKE AND METHOD FOR PRODUCING THE SAME

(75) Inventors: Akira Kato, Aichi-gun (JP); Kinji Hosoya, Gotenba (JP); Teruyuki Hosoya, Gotenba (JP); Shigeru Kikuchi, Gotenba (JP)

(73) Assignees: Toyota Jidosha Kabushiki Kaisha, Toyota-shi (JP); Aoi Co., Ltd., Gotenba-shi (JP)

( * ) Notice: Subject to any disclaimer, the term of this patent is extended or adjusted under 35 U.S.C. 154(b) by 419 days.

(21) Appl. No.: 12/974,504

(22) Filed: Dec. 21, 2010

(65) Prior Publication Data

US 2011/0146827 A1 Jun. 23, 2011

(30) Foreign Application Priority Data

Dec. 22, 2009 (JP) .................. 2009-290623

(51) Int. Cl.
*B29D 22/00* (2006.01)
*B29D 23/00* (2006.01)
*B32B 1/08* (2006.01)
*B65D 1/02* (2006.01)

(52) U.S. Cl.
USPC ... 428/36.92; 428/35.7; 428/36.9; 264/209.1; 138/111

(58) Field of Classification Search
USPC .................. 428/35.7, 36.9, 36.92; 264/209.1; 138/111
See application file for complete search history.

(56) References Cited

U.S. PATENT DOCUMENTS

| 6,630,025 B2 | 10/2003 | Nonomura et al. |
| 2006/0030678 A1 | 2/2006 | Brown et al. |

FOREIGN PATENT DOCUMENTS

| CN | 1993422 A | 7/2007 |
| JP | 8-33709 | 2/1996 |
| JP | 2000-62003 | 2/2000 |
| JP | 2001-327897 | 11/2001 |
| JP | 2003-236425 | 8/2003 |
| JP | 2004-344789 | 12/2004 |
| JP | 2006-150378 | 6/2006 |
| JP | 2009-45793 | 3/2009 |

OTHER PUBLICATIONS

Office Action issued Dec. 13, 2011, in Japanese Patent Application No. 2009-290623.
Office Action issued Apr. 27, 2012, in Chinese Patent Application No. 201010599521.5.

*Primary Examiner* — Michael C Miggins
(74) *Attorney, Agent, or Firm* — Oblon, Spivak, McClelland, Maier & Neustadt, L.L.P.

(57) ABSTRACT

This invention provides a tube having durability against harsh flexion, shrinkage, torsion, or the like and reduced slip resistance between tubes or upon contact with another member. Such tube is used for a product comprising a site at which a plurality of tubes are fixed at both ends and tied together with each other and/or in contact with another member, and the sites of fixation at the both ends are sites of motion at which reciprocal movement is repeated. Such tube is obtained via extrusion molding of a thermoplastic polyether ester elastomer and has a satin-finished outer surface. The invention also provides a method for preparing such tube.

9 Claims, 1 Drawing Sheet

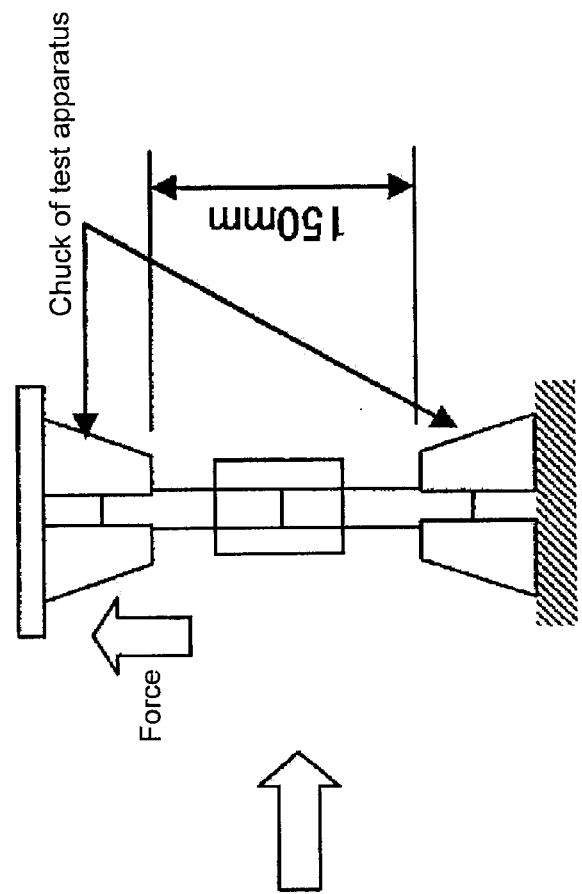
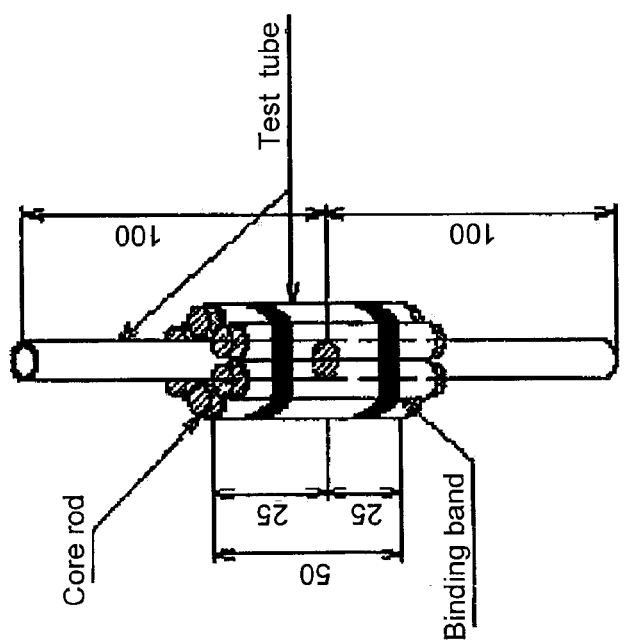

HIGHLY-DURABLE TUBE USABLE FOR MOVEMENT UNIT FOR ROTATION, FLEXION, AND THE LIKE AND METHOD FOR PRODUCING THE SAME

TECHNICAL FIELD

The present invention relates to a tube used for a movement unit for rotation, flexion, and the like and a method for producing the same.

BACKGROUND ART

A plurality of piping tubes that are used for wrists of paint robots and the like comprise sites at which such tubes are fixed at both ends and brought into contact with other constituents (e.g., other tubes and tube guides). At such sites of fixation, harsh movements such as reciprocal contortion, bending, and scratching are repeated. Thus, tubes used for an apparatus having movement units that undergo flexion, extension, torsion, or friction are required to be durable against such harsh conditions. For example, nylon, polytetrafluoroethylene, or urethane resins have heretofore been known as materials for tubes used for wrists of paint robots (U.S. Pat. No. 6,630,025 (Column 4, lines 5-10); JP Patent Publication (kokai) No. 2004-344789 A (Paragraph 0016); and JP Patent Publication (kokai) No. 2006-150378 A (Paragraph 0028)).

Among such resins, nylon resin has been used as a soft form of nylon comprising a plasticizer. When it is used in a single-layer structure, disadvantageously, plasticizer bleeding takes place with the elapse of time, tubes become hardened or thinned, or cracks or fractures are generated via crazing (i.e., generation of small gaps).

When urethane resin is used in a single-layer structure, swelling, shrinkage, hardening, or other problems arise within a short period of time depending on the solvent atmosphere of the environment surrounding a coating machine due to a lack of solvent tolerance. Thus, use of such urethane resin is almost impossible.

When polytetrafluoroethylene resin is used in a single-layer structure, further, it is extremely poor in terms of anti-flexion-fatigue properties and abrasion tolerance. Thus, cracks or fractures are generated within a short period of time and use of such resin for piping in a robot is almost impossible.

Further, JP Patent Publication (kokai) No. 2003-236425 A (Paragraphs 0027 to 0029) discloses a paint tube with a three-layer structure: i.e., with an innermost layer of polytetrafluoroethylene; an intermediate layer of low-density polyethylene; and an outermost layer that is a conductive sheath. The conductive sheath that constitutes the outermost layer of the paint tube is black in order to impart conductivity. Thus, a fluid such as paint cannot be visually observed from the outside. In addition, a tube with a multi-layer structure is less cost-effective than a tube with a single-layer structure.

If a plastic product has a smooth surface such as a mirror-finish surface, in general, such surface becomes slippery for a fluid (e.g., a liquid or gas) that is in contact therewith, a substance is less likely to adhere thereto, and the coefficient of friction is likely to be lowered. When such plastic product is rubbed against a product of the same type, such products become agglutinated to each other (i.e., adhered to each other), and the slip properties thereof may become poor. Consequently, the coefficient of friction of the product is increased, which leads to increased amounts of abrasion. In extreme cases, defects such as flexion caused by agglutination may disadvantageously occur.

This tendency toward agglutination is likely to occur with another substance such as resin or metal as well as between products of the same type. Because an increased contact area results from a smooth surface, abrasion tolerance deteriorates due to an increase in contact resistance.

Accordingly, a plurality of piping tubes that are used for piping of a fluid (e.g., a liquid or gas) in a paint robot or the like having sites that are in contact with other constituents (e.g., tubes made of the same or different materials or tube guides) at which flexion, shrinkage, torsion, friction, or other movements occur to a significant degree are required to have smooth inner surfaces (i.e., inner circumferential sides), so as to avoid a pressure loss or accumulation of substances. In contrast, a tube with a smaller contact area and lower contact resistance that has an adequately rough (e.g., a satin finish) surface (i.e., the outer surface; the outer circumferential side) would be effective. Such tube is effective in terms of durability at the sites of movement units inside a paint robot or the like where harsh movement is repeated.

The above describes the effects of a technique for finishing the surface of a tube with a single-layer structure in an adequately rough state (e.g., a satin finish) using a monolayer extruder or a method for producing the same. With the use of a multi-layer extruder, for example, molding conditions such as the resin-molding temperature of the inner layer and the outer layer may be altered, so that a tube having an inner surface (the inner circumferential side) with excellent smoothness and an outer surface (the outer circumferential side) with adequate roughness (e.g., a satin finish) while suppressing smoothness can be produced.

SUMMARY OF THE INVENTION

Object to be Attained by the Invention

It is an object of the present invention to provide a tube having durability against harsh flexion, shrinkage, torsion, friction, or the like and allowing reduced slip resistance between tubes or upon contact with another member.

Means for Attaining the Object

The present invention is summarized as a tube used for a product comprising a site at which a plurality of tubes are fixed at both ends and tied together with each other and/or in contact with another member, and the sites of fixation at the both ends are sites of motion at which reciprocal movement is repeated, the tube being obtained via extrusion molding of a thermoplastic polyether ester elastomer and having a satin-finish outer surface.

Effects of the Invention

The present invention can provide a tube having durability against harsh flexion, shrinkage, torsion, and the like and allowing reduced slip resistance upon contact between tubes or with another member.

BRIEF DESCRIPTION OF THE DRAWING

FIG. 1 schematically shows the surface slip test.

EMBODIMENTS OF THE INVENTION

The tube of the present invention is used for a product having a site at which a plurality of tubes are fixed at both ends and tied together with each other and/or in contact with another member such as a tube guide or a tube made of another material and the sites of fixation at the both ends are sites of motion at which reciprocal movement is repeated. Examples of such tube include a tube used for a variety of robots, a piping tube provided inside the wrist of a paint robot (e.g., a paint tube or air tube), a spiral tube, and a conductive cable.

The outer diameter, the inner diameter, and the wall thickness of the tube of the present invention are not particularly limited, and such dimensions can be selected in accordance with the application. In the case of a piping tube provided inside the wrist of a paint robot (e.g., a paint tube or air tube), for example, the outer diameter is generally 3 mm to 20 mm and preferably 4 mm to 16 mm, the inner diameter is generally 2 mm to 16 mm and preferably 2.5 mm to 13 mm, and the wall thickness is generally 0.5 mm to 2.5 mm and preferably 0.75 mm to 2 mm.

A thermoplastic polyether ester elastomer used in the present invention is not particularly limited, provided that it is a thermoplastic elastomer mainly composed of polyester. An example thereof is a block copolymer comprising a hard segment composed of polyester comprising an aromatic dicarboxylic acid or an ester-forming derivative thereof and diol and a soft segment mainly composed of polyether.

The Shore D hardness of the thermoplastic polyether ester elastomer used in the present invention (in accordance with JIS K 7215) is preferably 45 D to 75 D and more preferably 50 D to 65 D, and the flexural modulus (in accordance with ASTM D 790) is preferably 90 MPa to 600 MPa and more preferably 150 MPa to 400 MPa.

The thermoplastic polyether ester elastomer may be used alone, or elastomers with two or more types of hardness may be combined in order to attain necessary properties.

Examples of an aromatic dicarboxylic acid or ester-forming derivative thereof used for the hard segment of the block copolymer include terephthalic acid, dimethyl terephthalate, isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, 5-sulfoisophthalic acid, and an ester-forming derivative of any thereof, with terephthalic acid and/or dimethyl terephthalate being preferable.

Examples of diols that are used for the hard segment of the block copolymer include: aliphatic diols, such as ethylene glycol, trimethylene glycol, tetramethylene glycol (1,4-butanediol), pentamethylene glycol, hexamethylene glycol, neopentyl glycol, and decamethylene glycol; alicyclic diols, such as 1,4-cyclohexanedimethanol and tricyclodecane dimethylol; and aromatic diols, such as xylylene glycol, 4,4'-dihydroxydiphenyl, 2,2-bis(4-hydroxyphenyl)propane, 2,2-bis[4-(2-hydroxyethoxy)phenyl]propane, bis(4-hydroxyphenyl)sulfone, bis(2-hydroxyphenyl)sulfone, bis[4-(2-hydroxyethoxy)phenyl]sulfone, 1,1-bis[4-(2-hydroxyethoxy)phenyl]cyclohexane, 4,4'-dihydroxy-p-terphenyl, and 4,4'-dihydroxy-p-quarter phenyl having molecular weights of 300 or less, with 1,4-butanediol being preferable.

Examples of polyethers (polyoxyalkylenes) used for the soft segment of the block copolymer include poly(ethylene oxide)glycol, poly(propylene oxide)glycol, poly(tetramethylene oxide)glycol, poly(hexamethylene oxide)glycol, ethylene oxide propylene oxide copolymer, poly(propylene oxide) glycol ethylene oxide addition polymer, and ethylene oxide tetrahydrofuran copolymer having number average molecular weights of about 300 to about 6,000, with poly(propylene oxide)glycol and poly(tetramethylene oxide)glycol being preferable.

A method for producing the block copolymer is not particularly limited, and such block copolymer can be produced by a known technique. Examples of such technique include: a method in which dicarboxylic acid or alcohol diester of dicarboxylic acid and glycol are subjected to the ester reaction or transesterification reaction to prepare a hard segment, and polyoxyalkylene glycol is added to perform a transesterification reaction to copolymerize a soft segment; a method in which a hard segment and the soft segment are subjected to an addition reaction; a method in which a hard segment is bound to a soft segment with a chain linking agent; and a method in which the reaction products are melt-mixed with each other.

The thermoplastic polyether ester elastomer used in the present invention is preferably a multi-block polymer comprising a hard segment comprising polybutylene terephthalate alternately linked with a soft segment comprising terephthalic acid ester of polyalkylene ether glycol.

The preferable thermoplastic polyether ester elastomer comprises a hard segment represented by formula (I):

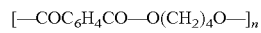

wherein —COC$_6$H$_4$CO— represents a terephthaloyl group and a soft segment represented by formula (II):

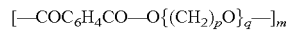

wherein —COC$_6$H$_4$CO— represents a terephthaloyl group.

As the preferable thermoplastic polyether ester elastomer, for example, the Hytrel™ Series (Du Pont-TORAY Co., Ltd.) is commercially available, and such commercial product can be used.

For example, Hytrel™ 6377 has a Shore D hardness of 63 (in accordance with JIS K 7215) and the flexural modulus of 353 MPa (in accordance with ASTM D 790), and it can be preferably used as a thermoplastic polyether ester elastomer.

The thermoplastic polyether ester elastomer used in the present invention may comprise additives, such as a stabilizer (e.g., a thermostabilizer, antioxidant, or light stabilizer) and a colorant (e.g., a pigment or masterbatch), within the scope of the present invention. The amount of such additives to be included is preferably 5% by mass or less, and more preferably 3% by mass or less, in total. The tube of the present invention can be prepared via extrusion molding of the thermoplastic polyether ester elastomer.

Raw materials used for the tube of the present invention do not contain a plasticizer. Thus, the tube would not undergo hardening, thinning, or crazing due to hardening or embrittlement with the elapse of time, and physical properties such as flexibility and performance would not be changed.

The tube of the present invention preferably has a drawing tension measured by the surface slip test described below of 9 N or less without application of the product petroleum jelly sold under the trademark Vaseline®.

(Surface slip test) As shown in FIG. 1, six test tubes are tied together by positioning two top and bottom test tubes at the center, these tubes being immobilized with the use of a binding band. In this case, a core rod is inserted in order to prevent the test tubes tied together with a binding band from deforming. The resultant is mounted on a tensile testing machine and drawn at a rate of 60 mm/minute. The force required for the test tubes at the center to be separated from the tube bundle is then measured.

The tube of the present invention can be prepared via extrusion molding of the thermoplastic polyether ester elastomer.

When performing injection molding or hollow molding (blow molding) of plastics, a mold surface may be intentionally creased or provided with fine irregularities, so that the resulting mold product has a satin-finish surface. In the case of extrusion molding, however, resin is constantly and continuously forced out with a cylinder screw. If a mold surface is processed as described above, accordingly, longitudinal lines (i.e., linear lines in parallel with the tube) are generated, melt-solidified products and the like, which are referred to as so-called "gum," are likely to be generated at the outlet of the mold, and longitudinal dents gradually become deeper. This causes leakage after connection and piping of joints, and functions of the tube would not be exerted. In the case of extrusion molding, accordingly, creases or fine irregularities cannot be formed on the mold.

Accordingly, the present inventors changed the standard temperature conditions for extrusion molding of a thermoplastic polyether ester elastomer and improved a pre-cistern at the inlet of the cooling tank and a mold part inside the outlet of the extruder to achieve a satin-finish state for the outer surface of the tube. As a result, the surface slip properties of the tube were improved.

Specifically, standard temperature conditions necessary for molding of a thermoplastic polyether ester elastomer are temperature conditions that yield a mildly ascending curve while the thermoplastic polyether ester elastomer is reaching a mold (i.e., a die and a mandrel) from the inlet of the extruder (i.e., from a hopper outlet to a cylinder inlet) through a cylinder, an adaptor, and a gear pump. Under such conditions, tube molding can be carried out with stability; however, cooling of the tube ejected from the mold (i.e., high-temperature resin) in a cooling tank is time-consuming. This disadvantageously delays resin crystallization and smoothes the outer surface of the tube. Thus, a satin-finish configuration of interest cannot be formed.

In order to impart a satin-finish surface to the tube, it is necessary to accelerate resin crystallization in the cooling tank. This requires rapid lowering in resin temperature in the mold. Selective lowering of temperature of the mold, however, would result in an entire lack of thermal hysteresis during resin molding, and the most important mechanical properties of the tube and smoothness of the inner surface of the tube cannot be attained.

To this end, it is necessary to set the molding temperature before the mold is reached higher than the standard temperature and to provide a required sufficient thermal hysteresis to resin.

Accordingly, raising of the cylinder temperature and the adaptor temperature to 15° C. to 20° C. above and the gear pump temperature by 5° C. to 10° C. above compared with the standard temperature conditions enables the provision of a sufficient thermal hysteresis to the tube. By lowering the mold temperature to 30° C. to 35° C. below the standard temperature conditions, resin crystallization can be accelerated.

The tube molded under such temperature conditions maintains sufficient mechanical properties required for a tube as well as smoothness of the tube inner surface, and a satin-finish surface can also be imparted to such tube because of accelerated crystallization of the tube outer surface. Changing of the tube-molding temperature conditions necessitates modification of the design of jigs that regulate the dimensions of products provided in a mold or cooling tank. Required dimensions can be set in accordance with molding conditions.

According to a preferable embodiment, when a tube with an outer diameter of 10 mm and an inner diameter of 8 mm is molded at a cylinder temperature of 220° C. to 245° C., an adapter temperature of 235° C. to 245° C., a gear pump temperature of 225° C. to 240° C., and mold temperature of 195° C. to 205° C., for example, a thermoplastic polyether ester elastomer is subjected to extrusion molding by setting the mold diameter to 19 mm to 21 mm, the mandrel diameter of 14 mm to 15 mm, the F ring diameter to 13.6 mm to 14.6 mm, the R ring diameter of 10.5 mm to 11.5 mm, and the sleeve diameter to 10.6 mm to 11.6 mm.

This description includes part or all of the contents as disclosed in the description and/or drawings of Japanese Patent Application No. 2009-290623, which is a priority document of the present application.

EXAMPLES

The following examples are provided in order to describe the present invention in greater detail, although the technical scope of the present invention is not limited thereto.

Example 1 and Comparative Examples 1 and 2

Production of Tube

With the use of a thermoplastic polyether ester elastomer (Hytrel™ 6377, hardness: Shore D hardness of 63, Du Pont-Toray), a tube having an outer diameter of 10 mm and an inner diameter of 8 mm was prepared with the use of a monolayer extruder under the molding conditions shown in Table 1.

TABLE 1

| Extrusion molding temperature conditions (unit: ° C.) | | | | | | | | | | | |
|---|---|---|---|---|---|---|---|---|---|---|---|
| Part of extruder | C1 | C2 | C3 | C4 | AD | GP1 | GP2 | GP3 | GPAD | D1 | D2 |
| Standard temperature conditions | 205 | 210 | 215 | 225 | 225 | 225 | 225 | 225 | 230 | 235 | 235 |
| Improved temperature conditions | 225 | 225 | 230 | 240 | 240 | 235 | 235 | 230 | — | 200 | 200 |

| Jigs for regulating dimensions of mold and product (unit: mm) | | | | | |
|---|---|---|---|---|---|
| Mold/jig | Mold (die) | Mold (mandrel) | F ring | R ring | Sleeves (front and back) |
| Standard dimensions | φ 20 | φ 15.1 | φ 13.52 | φ 11.0 | φ 11.1 |
| Improved dimensions | φ 20 | φ 14.5 | φ 14.1 | φ 11.0 | φ 11.1 |

When a tube was prepared in accordance with the conditions for improvement shown in Table 1 (i.e., extrusion molding temperature and jigs for regulating dimensions of a mold and a product), the resulting tube had a satin-finish outer surface, and this tube was designated as the tube of Example 1. When a tube was prepared in accordance with the standard molding conditions shown in Table 1 (i.e., extrusion molding temperature and jigs for regulating dimensions of a mold and a product), however, the resulting tube had a mirror-finish outer surface, and this tube was designated as the tube of Comparative Example 1.

A commercially available nylon tube N2-4-10×8 (outer diameter: 10 mm; inner diameter: 8 mm, Nitta Moore) was used for the following test as the tube of Comparative Example 2.

Test Example 1

Surface Slip Test

As shown in FIG. 1, six test tubes were tied together by positioning two top and bottom test tubes at the center, and these tubes were immobilized with the use of a binding band. In this case, a core rod was inserted in order to prevent the test tubes tied together with a binding band from deforming. The resultant was mounted on a tensile testing machine and drawn at a rate of 60 mm/minute. The force required for the test tubes at the center to be separated from the tube bundle was then measured.

As with the case in which the tubes were mounted on a machine, the force was also measured out regarding a case in which petroleum jelly was applied to a contact area of the tube.

The results are shown in Table 2.

TABLE 2

| Test tube | Drawing tension of test tube (N) | | | |
|---|---|---|---|---|
| | No. 1 | No. 2 | No. 3 | Average |
| (i) Between test tubes | | | | |
| Comparative Example 2 | 12.90 | 9.75 | 11.35 | 11.33 |
| Comparative Example 1 | 19.40 | 24.30 | 22.05 | 21.92 |
| Example 1 | 5.42 | 5.28 | 5.54 | 5.41 |
| (ii) Petroleum jelly application | | | | |
| Comparative Example 2 | 5.30 | 5.90 | 6.00 | 5.73 |
| Comparative Example 1 | 7.30 | 6.65 | 6.35 | 6.77 |
| Example 1 | 3.74 | 3.32 | 3.58 | 3.55 |

Test Example 2

Abrasion Tolerance Test

Both ends of the test tubes were mounted on the joints of the abrasion test apparatus, the joints were repeatedly moved reciprocally in the horizontal direction to move the tubes upward and downward, and the tubes were allowed to slide against contact materials (i.e., (i) a test tube fixed via insertion of a piano wire; (ii) a hexagonal SUS rod). In order to adjust the sliding distances of tubes to be compared, the tubes to be compared were bound with a binding band to accommodate displacement variations.

After the completion of a given number of repetitions (i.e., the number of cycles) under the test conditions below, cross-sectional areas were determined by measuring the dimensions of cross sections before and after the abrasion test, and the amounts of abrasion of the tubes were compared.

The test conditions are given below.
(Test Conditions)
Length of test tube: 490 mm
Distance between test tube bundles: 220 mm
Stroke of test apparatus: 160 mm
Repeated cycles: 60 (reciprocation/minute)
Number of repetitions: 1,000,000 times
Upward and downward displacement of tube: about 40 mm The results are shown in Table 3.

TABLE 3

| Test tube | Cross-sectional area of maximal abrasion area (mm$^2$) | | |
|---|---|---|---|
| | Before test | After test | Amount of change |
| (i) Between test tubes | | | |
| Comparative Example 2 | 28.274 | 28.270 | −0.004 |
| Comparative Example 1 | 28.196 | 28.192 | −0.004 |
| (ii) Between tube and hexagonal SUS rod | | | |
| Comparative Example 2 | 27.882 | 27.835 | −0.047 |
| Comparative Example 1 | 28.039 | 28.017 | −0.022 |

According to the results of the abrasion acceleration test, a plastic tube containing no plasticizer produces smaller surface slipping effects induced by so-called bleeding (i.e., surface embossing) of a plasticizer (a low-molecular-weight plasticizer such as oil), compared with a general nylon tube containing a plasticizer. In the case of a general tube with a smooth surface, accordingly, a tube containing no plasticizer is likely to be found to have less abrasion tolerance than a tube containing a plasticizer by the abrasion test conducted under such conditions. However, the abrasion tolerance of the tube having a satin-finish surface obtained under the molding conditions of the present invention was found to be substantially equivalent to that of a tube containing a plasticizer upon sliding against another tube. When the test was carried out with a metal (i.e., a hexagonal stainless steel rod), the abrasion tolerance of the tube containing no plasticizer was half or less than that of a nylon tube containing a plasticizer.

Test Example 3

Test Conducted on Real Paint Robot (Acceleration Test)

The tubes of the Example and the Comparative Examples were allowed to pass into the wrist (inner diameter: 70 mm) of a paint robot (KT264, domestic specification) and a durability test was carried out under the following conditions.
(Specification of Paint Apparatus)
Paint apparatus: ROBOBEL951 (ABB); tube occupancy in wrist: 26.4%
(Test Conditions)
(i) Testing is carried out in the presence of bound spiral tubes without the application of petroleum jelly for reducing friction resistance between tubes.
(ii) Testing is carried out in the absence of bound spiral tubes with the application of petroleum jelly for reducing friction resistance between tubes.
(Test Results)
A new tube was used as a conventional nylon tube containing a plasticizer (i.e., the tube of Comparative Example 2).

The tube was cut by performing the test about 20,000 times under the conditions of (i) and about 170,000 times under the conditions of (ii).

A new tube was used as the tube of Example 1, and no problems were observed after the test had been repeated about 100,000 times under the conditions of (i). The tube subjected to the test under the conditions of (i) was subjected to the test under the conditions of (ii), and no problems were observed after the test had been repeated about 200,000 times. No problem was observed after the test had been repeated 300,000 times in total since test (i) and test (ii) had been continuously carried out.

All publications, patents, and patent applications cited herein are incorporated herein by reference in their entirety.

The invention claimed is:

1. A tube used for a product comprising a site at which a plurality of tubes are fixed at both ends and tied together with each other and/or in contact with another member, and the sites of fixation at the both ends are sites of motion at which reciprocal movement is repeated, the tube being obtained via extrusion molding of a thermoplastic polyether ester elastomer and having a satin-finish outer surface.

2. The tube according to claim 1, wherein the thermoplastic polyether ester elastomer is a multi-block polymer comprising a hard segment of polybutylene terephthalate alternately linked with a soft segment of terephthalic acid ester of polyalkylene ether glycol.

3. The tube according to claim 1, which is a piping tube or spiral tube.

4. The tube according to claim 1, which does not contain a plasticizer.

5. The tube according to claim 1, which has a single-layer structure.

6. The tube according to claim 1, wherein a drawing tension measured by a surface slip test is 9 N or less without application of petroleum jelly and wherein the surface slip test comprises tying together six test tubes by positioning two top and bottom test tubes at the center, such tubes being immobilized with the use of a binding band, inserting a core rod to prevent the test tubes from deforming, mounting the test tubes on a tensile testing machine, drawing the tubes at a rate of 60 mm/minute and measuring the force required for the test tubes at the center to be separated from the tube bundle.

7. A paint robot comprising the tube according to claim 1 provided inside a wrist of the robot.

8. A method for producing the tube according to claim 1 comprising extrusion molding of a thermoplastic polyether ester elastomer.

9. The method of production according to claim 8, wherein, when a tube with an outer diameter of 10 mm and an inner diameter of 8 mm is molded by setting a cylinder temperature at 220° C. to 245° C., an adapter temperature at 235° C. to 245° C., a gear pump temperature at 225° C. to 240° C., and a mold temperature at 195° C. to 205° C., the thermoplastic polyether ester elastomer is subjected to extrusion molding with a mold diameter of 19 to 21 mm, a mandrel diameter of 14 to 15 mm, a F ring diameter of 13.6 to 14.6 mm, a R ring diameter of 10.5 to 11.5 mm, and a sleeve diameter of 10.6 to 11.6 mm.

* * * * *